Inventors
Robert William Leach &
William Henry Bateman
by their Attorneys:
English & Studwell Patented Apr. 30, 1935

1,999,592

UNITED STATES PATENT OFFICE 1,999,592

VALVE

Robert William Leach and William Henry Bateman, Newport, England

Application March 14, 1932, Serial No. 598,706
In Great Britain May 9, 1931

6 Claims. (Cl. 251—34)

This invention relates to valves of the kind in which one side of a rotary disc co-operates with a complementary seating in the body part for controlling a passage in the body situated at one side of the axis of rotation of the disc. In such valves the working face of the disc or of the seating is formed with an annular channel into which lubricant is supplied under pressure from a lubricant storage chamber. As is well known there is a tendency in valves of this kind for the disc to stick to the seating, even when the working faces are adequately lubricated, and use is made of the lubricating fluid to release the disc prior to its movements from one position to another. When the fluid passages or passages are not symmetrically disposed about all diameters of the disc, the centre of pressure of the fluid acting on one face of the disc does not coincide with its centre of revolution. Hitherto the grooves which are supplied with lubricant under pressure to urge the disc from its seat have been symmetrically disposed about the axis of revolution of the disc, and consequently when pressure is exerted on the disc by the lubricant to release the disc from its seating, the effect of the lubricant pressure is ordinarily to tilt the disc about the part of the disc periphery remote from the openings in the disc. The object of the present invention is to obviate this tilt in a simple and convenient manner.

The invention comprises the arrangement or shaping and positioning of the lubricant groove or grooves in the face of the disc or seating so that the axial thrust exerted on the disc by the lubricant in the grooves has its centre of pressure sufficiently coincident with the centre of pressure of the fluid acting upon the opposite side of the disc, that the disc may move from its seating uniformly at all parts, when it is required to release the disc from its seating by the lubricant pressure.

Pressure variations in the lubricating grooves due to the reluctance of highly viscous mediums to flow tend to alter the centre of pressure of the thrust exerted by the lubricant, but the disadvantages arising from this condition can also be overcome by this invention.

In the accompanying drawings, Figure 1 is a sectional elevation of a valve constructed in accordance with this invention.

Figure 4 is an elevation of a portion of the working face of the disc showing a modified form of the lubricant groove.

Figure 5 is an elevation of the valve disc showing a different modification of the lubricant groove.

Figure 1:
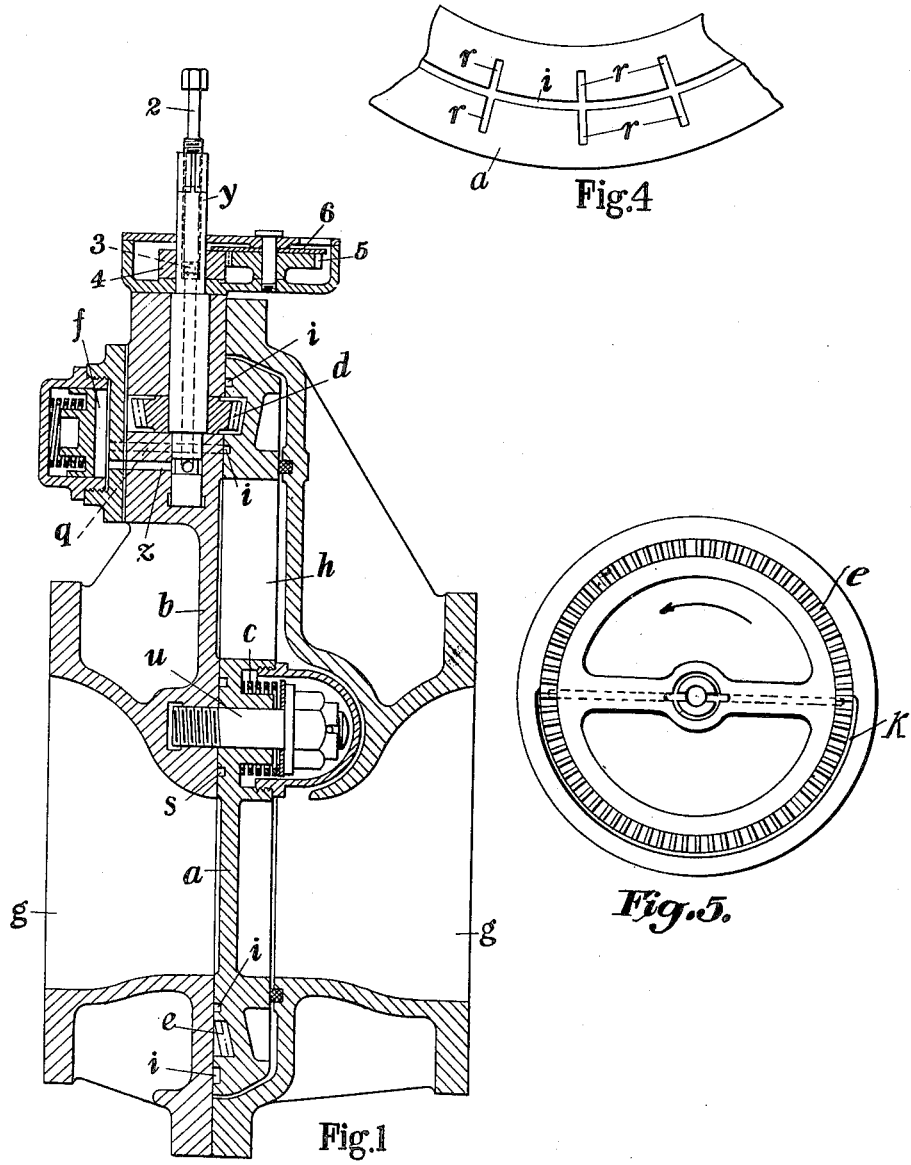

In carrying the invention into effect as shown, the rotary disc $a$ is held against its seating in the body $b$ by a spring $c$. Rotation of the disc about its central axis is effected by any convenient means such as a pinion $d$ in the body part engaging a toothed ring $e$ in the disc. The toothed ring in the example shown subtends rather more than one half of the face of the disc. At one side of the disc adjacent to the periphery is arranged in the body part the reservoir $f$ from which lubricant can be forced under pressure to the working face of the disc. The fluid passages $g$ in the body part are situated at one side of the axis of the disc and the latter is formed with an aperture $h$ which can be moved into coincidence with or away from the passage.

Lubricant is distributed around the working faces of the disc $a$ and seating by one or more annular grooves $i$ in the disc. Previously these have been made of uniform width, but according to the present invention the lubricant groove, or one or each of the grooves, is shaped so that its width gradually increases from a minimum at one point to a maximum at a diametrically opposite point, or, as shown in the drawings, one of the grooves is uniformly narrow around the part adjacent to the aperture $h$ and is uniformly wide around the other part. A greater area is thus presented to the said working surfaces at the part adjacent to the position at which the fluid pressure is concentrated on the disc. Alternatively an annular groove or grooves of uniform width may be used in combination with one or more short radial grooves $r$ as shown in Figure 4. The localized increase in lifting effort may also be obtained in a variety of other ways, as for example, by means of one or more localized enlargements in the groove.

The variations in the areas exposed to lubricant pressure are such that when the valve is pressed off its seating by the lubricant, the pressure exerted by the lubricant obviates the setting up of a tilting action. Consequently the valve can be separated from its seating uniformly, whether the valve is open or closed.

The invention is not limited to the example above described as subordinate details can be varied to suit different requirements. Thus the groove or grooves $i$ may be arranged in the seating surface instead of the disc. Or the grooves $i$ can be dispensed with, in which case the groove containing the toothed ring e is made to extend around the entire face of the valve, as shown in Fig. 5, and has lubricant supplied to it. This groove is then made suitably wider at one part k, than in the other parts thereof, or is provided at suitable parts with appropriate enlargements or branches. Also we desire it to be understood that the term lubricant is intended to include viscous substances employed for making a seal or fluid tight contact between the disc and its seating. It will be noted that in all of the modifications shown, the lubricant groove in one of the working faces presents a larger area to the other working face at the side of the axis of the disc opposite from that of the aperture through the disc.

Figure 2:
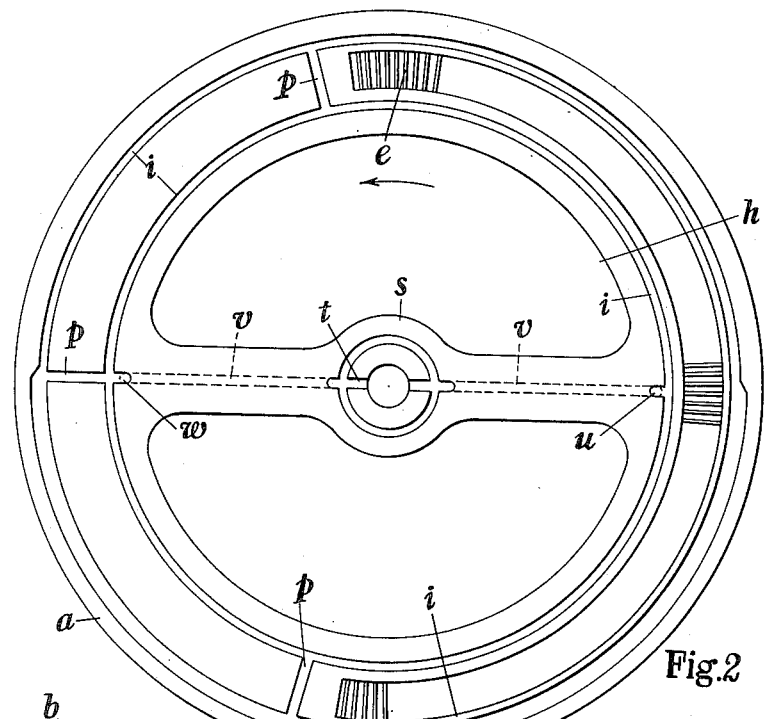
Figure 2 is an elevation showing the working face of the valve disc.
Figure 3:
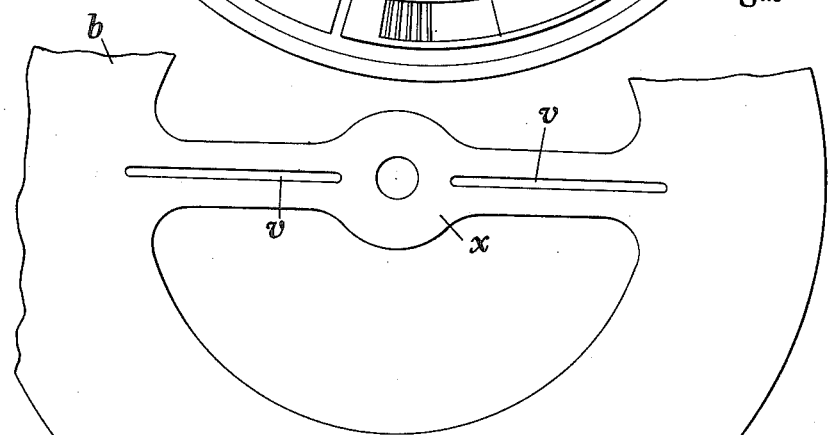
Figure 3 is an elevation showing a portion of the fixed seating with which the disc co-operates.

In the valve illustrated two annular grooves i are shown, one of them only being formed with a portion of increased width. If desired both may be made of increased width around a portion of its length. The two grooves are joined by cross grooves p. Lubricant is supplied to the inner groove i from the chamber f by a passage q. Also lubricant grooves s, t, are formed in the central portion of the disc to lubricate the face of that portion and of the spindle u. Access of lubricant from i to s is afforded by transverse grooves v formed in a transverse portion x of the fixed seating of the valve body as shown in Figure 3. When the disc a is in the closed position, the ends of the grooves v overlap short radial grooves w opening into the inner groove i as shown by dotted lines in Figure 2, and so allow lubricant to pass from i to s. When the disc a is rotated to the open position, the grooves w pass away from the grooves v, and interrupt the communication between the grooves i and s. If the grooves v were formed in the face of the disc they would be exposed when the disc is rotated to the open position and lubricant would escape. This undesirable condition is avoided by the construction shown.

Lubricant is charged into the chamber f in any convenient manner, as for example through the hollow spindle y of the pinion d, the lubricant passing from the spindle along a passage z. The open end of the spindle is closed by a screwed plug 2, and escape of lubricant from the plug when the plug is removed is prevented by a non-return valve 3.

The part 4 on the spindle is a pinion by which a pinion 5 carrying an indicator 6 is rotated with the spindle, the indicator serving to show whether the valve is open or closed.

Having thus described our invention what we claim as new and desire to secure by Letters Patent is:—

1. In a valve, a rotary disc having an aperture at one side of its axis, a seating complementary to said disc and having a passage adapted to coincide with said aperture at one rotational position of said disc, said disc and seating having working faces, and an endless annular lubricant groove in one of said faces, said groove presenting a larger area to the other of said faces at one side of the axis of said disc than at the other side of said axis.

2. In a valve, a rotary disc having an aperture at one side of its axis, a seating complementary to said disc and having a passage adapted to coincide with said aperture at one rotational position of said disc, said disc and seating having working faces, and an endless annular lubricant groove in one of said faces extending coextensively with the periphery of the disc, said groove presenting a larger area to the other of said faces at the side of the axis of said disc opposite from that of said aperture.

3. In a valve, a rotary disc having an aperture at one side of its axis, a seating complementary to said disc and having a passage adapted to coincide with said aperture at one rotational position of said disc, said disc and seating having working faces, and an annular lubricant groove in one of said faces, said groove being wider at one side of the axis of the disc than at the other side of the axis.

4. In a valve, a rotary disc having an aperture at one side of its axis, a seating complementary to said disc and having a passage adapted to coincide with said aperture at one rotational position of said disc, said disc and seating having working faces, and an annular lubricant groove in one of said faces, said groove having an enlargement in a portion thereof located at one side only of the axis of the disc.

5. In a valve, a rotary disc having an aperture at one side of its axis, a seating complementary to said disc and having a passage adapted to coincide with said aperture at one rotational position of said disc, said disc and seating having working faces, an annular lubricant groove in one of said faces near the periphery of said disc, said groove having a wider portion located at the side only of the axis of the disc opposite to that in which the aperture is located, an annular groove in said same face near the center of said disc, and transverse grooves in one of said faces communicating between said annular grooves.

6. In a valve, a rotary disc having an aperture at one side of its axis, a seating complementary to said disc and having a passage adapted to coincide with said aperture at one rotational position of said disc, said disc and seating having working faces, an endless annular lubricant groove in one of said faces, the groove being so positioned that it extend co-extensively with the periphery of the disc and is constantly closed at one side during both open and closed positions of the disc by constant contact with the working face of the seating, said groove being so shaped that lubricant forced into it exerts a thrust greater on the side of the axis of the disc where the passage is not located than on that side of the disc wherein the passage is located.

ROBERT WILLIAM LEACH.
WILLIAM HENRY BATEMAN.